(12) United States Patent
Kuhn et al.

(10) Patent No.: US 11,808,367 B2
(45) Date of Patent: Nov. 7, 2023

(54) VALVE, DEVICE FOR REGULATING THE PRESSURE OF A FLOW MEDIUM USING THE VALVE, AND DEVICE FOR SECURING THE VALVE IN A TRANSMISSION COMPONENT

(71) Applicant: Schaeffler Technologies AG & Co. KG, Herzogenaurach (DE)

(72) Inventors: Lukas Kuhn, Oberreichenbach (DE); Horst Hartmann, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/625,106

(22) PCT Filed: Jun. 26, 2020

(86) PCT No.: PCT/DE2020/100555
§ 371 (c)(1),
(2) Date: Jan. 6, 2022

(87) PCT Pub. No.: WO2021/018341
PCT Pub. Date: Feb. 4, 2021

(65) Prior Publication Data
US 2022/0260165 A1 Aug. 18, 2022

(30) Foreign Application Priority Data
Jul. 26, 2019 (DE) ...................... 10 2019 120 225.6

(51) Int. Cl.
*F16K 15/06* (2006.01)
*F16H 61/02* (2006.01)
(Continued)

(52) U.S. Cl.
CPC ....... *F16K 15/063* (2013.01); *F16H 61/0276* (2013.01); *F16K 27/0209* (2013.01); *G05D 16/103* (2013.01); *Y10T 137/7925* (2015.04)

(58) Field of Classification Search
CPC ............... F16K 15/025; F16K 27/0209; Y10T 137/7504; Y10T 137/7925
See application file for complete search history.

(56) References Cited

U.S. PATENT DOCUMENTS

| | | | |
|---|---|---|---|
| 2,590,244 A | 3/1952 | Harbison | |
| 3,092,133 A * | 6/1963 | Clark | ...................... F16K 1/126 137/220 |

(Continued)

FOREIGN PATENT DOCUMENTS

| | | |
|---|---|---|
| DE | 19731557 A1 | 1/1999 |
| DE | 19739904 A1 | 3/1999 |

(Continued)

*Primary Examiner* — Robert K Arundale (57) ABSTRACT

A valve includes a valve axis extending in an axial direction, a valve housing, a ring that surrounds the valve axis, a seal, a spring for exerting a spring force, and a piston arranged in the valve housing. The valve housing includes a first valve housing opening through which a flow medium can pass. The ring is secured to the first valve housing opening. The seal is held on the valve housing by the ring. The piston is coaxial to the valve housing on the valve axis and axially faces the first valve housing opening. The piston is axially movable in the valve housing against the spring force, and the first valve housing opening can be closed by the piston.

8 Claims, 4 Drawing Sheets

(51) Int. Cl.
*F16K 27/02* (2006.01)
*G05D 16/10* (2006.01)

(56) References Cited

U.S. PATENT DOCUMENTS

| | | | | |
|---|---|---|---|---|
| 4,265,271 | A | 5/1981 | Rosaen et al. | |
| 5,370,150 | A * | 12/1994 | Nehm | F16L 29/02 |
| | | | | 137/454.2 |
| 5,918,628 | A * | 7/1999 | Harding | F02C 7/232 |
| | | | | 137/538 |
| 8,408,244 | B2 * | 4/2013 | Gilcher | E03C 1/104 |
| | | | | 137/454.2 |
| 2004/0074539 | A1 * | 4/2004 | Weis | E03C 1/104 |
| | | | | 137/543 |
| 2006/0011238 | A1 | 1/2006 | Fangmeier | |
| 2007/0272315 | A1 * | 11/2007 | Lewis | G05D 16/187 |
| | | | | 137/625.3 |
| 2013/0037133 | A1 | 2/2013 | Hong | |
| 2014/0311585 | A1 * | 10/2014 | Rickis | F16K 15/025 |
| | | | | 137/538 |
| 2015/0211500 | A1 * | 7/2015 | Kumazawa | F04B 1/182 |
| | | | | 137/538 |
| 2020/0408316 | A1 * | 12/2020 | Patterson | F16K 39/04 |

FOREIGN PATENT DOCUMENTS

| | | | |
|---|---|---|---|
| DE | 102007002445 A1 | 7/2008 | |
| DE | 102007035706 A1 | 8/2008 | |
| DE | 102015200542 A1 | 7/2016 | |
| DE | 102015211599 A1 | 12/2016 | |
| DE | 102019108694 A1 * | 4/2020 | |
| DE | 102018131097 A1 * | 5/2020 | |
| DE | 102018131098 A1 * | 6/2020 | |
| DE | 102019120226 A1 * | 8/2020 | |
| DE | 102019120227 A1 * | 8/2020 | |
| DE | 102019120221 A1 * | 1/2021 | ......... F16K 17/0433 |
| DE | 102020112780 A1 * | 11/2021 | |
| FR | 2648534 A1 | 12/1990 | |
| JP | 2007055612 A | 3/2007 | |

* cited by examiner

VALVE, DEVICE FOR REGULATING THE PRESSURE OF A FLOW MEDIUM USING THE VALVE, AND DEVICE FOR SECURING THE VALVE IN A TRANSMISSION COMPONENT

CROSS-REFERENCE TO RELATED APPLICATIONS

This application is the United States National Phase of PCT Appln. No. PCT/DE2020/100555 filed Jun. 26, 2020, which claims priority to German Application No. DE102019120225.6 filed Jul. 26, 2019, the entire disclosures of which are incorporated by reference herein.

TECHNICAL FIELD

The present disclosure relates to a valve with a valve housing, a piston, and a spring. The piston and the valve housing are coaxial to each other on an imaginary valve axis, said valve axis being axially oriented in a first axial direction and in a second axial direction opposite the first axial direction. The piston is received in an axially movable manner in the valve housing against the spring force of the spring, and a first valve housing opening, through which the flow medium can pass, axially faces the piston and can be closed by the piston. The present disclosure additionally relates to a device for regulating the pressure of a flow medium in a vehicle transmission and to a device for securing a pressure compensating valve in a component of the vehicle transmission.

BACKGROUND

Valves of this type are secured in the housing in a variety of ways. DE 10 2007 002 445 A1 shows a valve that is secured in the housing by means of a welded joint. Such a securing technique requires weldable material of the same design of the housing and the valve or a securing element. Therefore, when the valve is inserted into a housing of a vehicle transmission made of an aluminum alloy, for example, it is difficult to make such a connection. In addition, welded joints often cannot be used in every case because of heat input during welding and possible weld spatter.

Other valves are screwed in, as disclosed in U.S. Pat. No. 2,590,244 A. Such a securing requires a relatively elaborate preparation of the valve seat, as a thread must also be made in the bore for the valve seat in the housing. DE 197 39 904 A1 shows a valve that is secured axially in the valve seat by caulking. During the production of the caulking, material is plastically displaced from the housing with a punch and pressed against the back of the valve.

There are special requirements for the manufacture and assembly of valves whose valve body also has inlet or outlet openings directed transversely to the valve axis. Such a valve is disclosed in DE 10 2015 211 599 A1. For such valves, directed assembly is often necessary so that the transversely directed openings of the valve body and those of the associated channels in the housing are connected in such a way that they are permeable with one another.

From DE 197 31 557 A1 a valve of the type is known which is held together in the region of the inlet opening by a clasping part. On the one hand, the clasping part is used to hold a valve plate with a valve seat on the valve housing, and on the other hand, the clasping part serves as a seal for the seat of the valve in a housing. Alternatively, the valve seat is formed on the clasping part. In this context, a valve seat is understood to be a sealing stop of the valve body (piston) on the valve housing, a valve plate or on a clasping element near an inlet opening of the valve. For its function as a seal, the clasping element is provided with a layer made of an elastomer. The elastomer on the clasping element elastically secures a good sealing effect on the valve seat and at the same time compensates for manufacturing tolerances on the seat of the valve.

SUMMARY

The arrangement according to the disclosure provides a seal separate from the valve seat, which is held by a ring also separate from the valve housing. The seal, which in its simplest and most effective form is formed by an O-ring, is a simple component that can be mass-produced at low cost. The O-ring has a round, oval or any other cross section. The materials of the seal may be elastomers or other elastic materials. Alternatively, the seal can also be made from several components, optionally integrally with metal components. The ring with which the seal is held on the valve is also a simple component that can be inexpensively manufactured from plastic or sheet metal, for example.

Production of components with an elastomer coating according to the examples cited in the BACKGROUND is generally more complex. When selecting the material, it must also be taken into account that its material properties must be suitable for bonding with the substrate and that the choice of material is therefore limited. In addition, there are limits to the thickness of the elastomer layer, both for machining reasons and for the function of a clasping part, which is also used to hold the valve plate.

The seal of the valve according to the present disclosure can be designed as an individual part with regard to its dimensions and material exclusively for the intended sealing function and compatibility with a flow medium. The seal can be variably adapted to changing requirements without requiring changes on the valve or the ring itself. The ring itself can also be easily replaced if requirements change, for example in connection with a dual function as an anti-rotation device, without having to change the seal or the valve as a result.

With respect to a dual function of the ring, one embodiment provides that at least one anti-twist device is secured to the first opening. In this context, anti-twist device means a device which ensures that the valve is seated in a housing exactly in a predetermined position. This is to prevent the valve from rotating about its own valve axis and/or wandering in the axial direction in the bore of the housing. The anti-twist function is integrated into the ring, which thus has a dual function. On the one hand, the ring is used to hold the seal and, on the other hand, the ring provides an anti-twist device. The anti-twist device also serves as an aid for oriented assembly and for positioning the valve in the correct position in components. The correct position of the valve secures the position of its openings in relation to inlet and outlet channels.

The ring may be secured to the valve housing in a form-fitting manner. In this case, the connection between the anti-twist device and the valve housing may not consist of a material bond. The anti-twist device or ring has at least one radial projection directed transversely to the valve axis. The projection can be used, for example, in a form-fitting connection during subsequent installation in a vehicle transmission for position orientation and/or to secure the position of the valve. The ring or anti-twist device can be manufactured as a single part and then secured to the valve housing in a form-fitting manner. This makes it possible, for example, to adapt the position and orientation of the projection and thus the position of an anti-twist device to the specific features of differing installation situations. The valve or the valve housing itself does not need to be adapted to the changed installation situation in this respect.

A uniform design of the valve or valve housing can thus be used for different applications and position orientations. The valve housing can be manufactured in larger production batches and thus at low cost. The relatively high tooling costs for manufacturing the valve housing only have to be borne once. If necessary, it is only needed to adapt the anti-twist device to the application or to change the orientation of the anti-twist device or projection of an anti-twist device on the valve that can be used for several applications. Tooling required for the ring/anti-twist device can be designed inexpensively and easily, even for small batch production.

The projection can be secured to the valve housing in any position around the valve axis by selecting the appropriate form-fit connection. The non-detachable form-fit connection secures a solid non-twisting mount. The non-detachable form-fit connection allows the valve housing and the ring to be snapped together, hooked together, or interlocked together via plastic deformation of either the ring and/or portions of the valve housing. It is not excluded that a force-fitting and form-fitting connection or, alternatively, a material-bonding connection is provided.

One embodiment of the invention provides that the projection projects at least partially radially beyond an outer contour of the valve housing. For example, when the valve is supported axially at the end in a blind hole or a housing shoulder, the projection projecting beyond the valve housing engages in a form-fitting manner in a recess or groove at the bottom of the blind hole or in a corresponding recess of the housing shoulder.

According to one embodiment, the ring includes at least one ring-shaped base body. The projection, for example, then projects from the base body. The ring, in the event that it also functions as an anti-twist device, may have more than one projection. The annular base body engages axially in the first opening and axially engages behind an edge of the first opening at at least one point. In this way, the ring is secured at least in one axial direction, since the edge forms an axial undercut. The particular contour of the ring projects radially beyond the opening cross section of the first opening. In this way, the ring is held immovably in the axial direction, depending on the use of at least one or two undercuts.

In one embodiment, the edge includes a hollow cylindrical portion integrally designed with the valve housing and surrounding the first opening. The design of the hollow cylindrical portion offers more possibilities to design the form-fit connection. In an example embodiment, the hollow cylindrical portion is radially offset in diameter from the outer diameter of the valve. That is, a first outer diameter of the hollow cylindrical portion is less than a second outer diameter of the outer cylindrical contour of the valve housing and greater than a first inner diameter of the opening of the hollow cylindrical portion and/or the first opening. Such an arrangement makes it possible to place the base body of the ring on the valve body in a form-fitting manner without the latter projecting radially beyond the outer contour of the valve housing.

In addition, the hollow cylindrical portion on the outside may serve as a seat for the seal. The seal is optionally pressed onto the hollow cylindrical portion or pushed on with a snug seat or loosely seated and thus centered on the valve axis. The seal may have a radial oversize with respect to the diameter of the cylindrical outer surface of the valve housing with which it is seated in the bore of a component or in a channel. The radial interference is designed for the sealing function, for example for elastic preloading.

According to another embodiment, the ring can be inserted into the first opening of the valve housing. As a result, the seat of the ring occupies less space radially outwardly, since the base body of the anti-twist device is secured within or inserted into the opening and/or hollow cylindrical portion, and only a collar of the ring or anti-twist device extends outwardly. This creates more space for the seal so that, for example, its elastic behavior can be specifically adapted to certain application conditions by means of a larger material volume.

With a further embodiment, it is provided that a first collar and a second collar are formed on the base body. The first collar is directed radially outwardly away from the valve axis and can be folded over in this direction, for example, by plastic forming of a tubular or flat sheet blank of the ring. In addition, the collar is provided with the projection required for a form-fitting securing of the position of the valve. The second collar is directed radially outwardly away from the valve axis and axially engages behind the edge on the inside of the valve—that is to say on the other side of the first opening, i.e., on the side of the first opening on the inside of the valve. The seal is retained by the external first collar and is axially located between the first collar and the valve housing. Here, the seal sits on the hollow cylindrical portion at the entrance to the first opening. Alternatively, the ring also surrounds the hollow cylindrical portion and the seal sits radially on the ring, e.g., centered on its base body.

If the ring also serves as an anti-twist device, the seal and the anti-twist device are thus held in a simple and form-fitting manner on the edge of the first opening in both axial directions. The collars may be produced by plastic forming from a blank of the ring, which may be made of sheet steel.

Another embodiment provides that a valve seat for the piston is formed at the edge of the first opening, and the first opening is closable by the piston abutting the valve seat. The valve seat is an annular surface that sealingly corresponds to a geometry of an edge or surface of the piston. For example, the annular surface is designed on the ring, for example on the second collar. Sealing seats of the piston on the ring can also be variably designed to suit different applications without the basic design of the valve housing and thus its production being influenced by the type of sealing seat. Larger batch sizes of the valve housing can be produced. The production is therefore inexpensive.

Alternatively, an example embodiment provides for the valve seat to be formed directly on the valve housing material. The valve housing can be manufactured inexpensively from sheet metal as a pressed and/or drawn part. The material of the sheet may be steel. The formation of the valve seat can be integrated into the pressing or drawing process without additional effort. The design of the ring, anti-twist device and sealing arrangement can remain unaffected by the design of the valve seat.

According to another embodiment, a second opening permeable to the flow media is formed in the valve housing. The second opening is at least partially closable by the piston. The valve axis extends in the axial directions through the first opening, i.e., the first opening is axially oriented. The second opening is radially spaced apart from the valve axis. The projection projects radially beyond the valve housing, and it is directed radially transverse to the valve axis. The second opening is located behind the seal as seen in the direction of flow of the flow medium, so that when the valve is used in a device for regulating the pressures of a flow medium in a vehicle transmission, it is ensured by means of the seal that the flow volume of the flow medium flows completely without loss through the valve via the first opening and leaves the valve again at the second opening.

In the context mentioned above, the present disclosure provides a device for regulating pressures of a flow medium in a vehicle transmission. The device is formed from a portion of a transmission component, from at least a first channel and a second channel and from the valve, and additionally has a device for securing the valve or for position-oriented assembly in the transmission component. The valve is seated in a channel or through-bore or in a blind hole of the transmission component. A possible leakage gap formed at this seat of the valve in the component between the transmission component and the valve is sealed with the help of the seal. In this regard, the seal is supported on the valve housing and/or the ring, e.g., preloaded radially with respect to the component in one direction as well as in the other radial direction. Such an arrangement prevents flow medium from inadvertently reaching the rear of the valve via the seat of the valve housing in the transmission component and/or from mixing with another medium at the end of the valve remote from the first opening. In addition, unintentional pressure equalization or pressure loss via the leakage gap is prevented, if applicable.

In the portion of the transmission component, the first channel leads to the first opening and the second opening opens out into the second channel. The projection formed on the ring engages in a recess of the transmission component. The device for securing a pressure compensating valve in the transmission component is formed by the projection and the recess and is therefore simple and inexpensive to produce. In addition, the ring of this device serves two functions. One function is the anti-twist device and the other function is to hold the seal on the valve.

The position-oriented assembly ensures, for example, that the second opening and the second channel are precisely aligned with one another. As provided in one embodiment of the invention, the first opening and the piston base are arranged coaxially with the valve axis, but the second opening in the valve housing is oriented transversely to the first opening. The form-fitting connection formed by the first projection and the recess between the valve and the transmission component is formed on a side of the valve housing opposite the second opening, for example, which is a longitudinal groove in the transmission component designed as a housing or transmission shaft.

The valve is provided with a sleeve-shaped valve housing which has a sleeve casing oriented concentrically to the valve axis and an edge made of sheet metal that is oriented radially in the direction of the valve axis and extends around the first opening. The valve seat is stamped directly into the edge made of sheet metal. Such a solution can be produced inexpensively. There is no need for a costly machining of a valve seat. The projection projects from the anti-twist device or first collar at the edge of the first opening.

The piston is sleeve-shaped with a hollow cylindrical piston casing and a piston base closing the piston on one side, and the spring is axially surrounded by the piston casing and supported axially inside the piston on the piston base. The piston may be made of sheet metal. The piston base is correspondingly thin-walled. Compared with solidly formed pistons, more axial space as well as installation space is available inside the piston for the spring, as the spring is inserted axially into the piston and supported on the back of the piston base surface facing the first opening. This provides more options for the selection and design of the spring. The spring can also include several springs connected in parallel or in series.

The second opening is oriented to be transverse to the first opening and is introduced into a valve housing made of sheet metal, e.g., by punching. The second opening extends in the axial direction at a radial distance from the valve axis. The center axis of the opening runs in the radial direction perpendicular to the valve axis. The valve housing can be produced easily and inexpensively.

The piston is guided via the piston casing in an axially movable manner in the valve housing and centered radially in the valve housing. This results in an essentially pressure-tight and at the same time axially movable guidance of the piston in the valve housing, in particular when the radial play with which the piston is centered radially in the housing is small. The play may be 30 μm, for example. The sliding surfaces, i.e., the diameter of the inner cylindrical surface of the valve housing and the outer cylindrical surface of the piston, can be set precisely when these components are drawn from sheet metal without machining. Sliding coatings on the surfaces of the components can be advantageous.

The piston is guided to be axially movable in the valve housing against the spring forces of the spring from a closed position into an open position. In the closed position of the piston, the first opening is closed by the piston base and the second opening is at least partially closed by the piston casing. In the open position, the piston base has lifted off the valve seat. An edge or a contour of the piston releases the second opening analogously to a control edge, so that a connection is formed between the first opening and the second opening through which flow medium can flow. The open end of the valve housing axially opposite the first opening is sealed off from the flow medium in both the closed position and the open position by the piston, subject to a leakage gap caused by radial play through the piston.

Already or still in the closed position, the second opening, which in this case is a return opening, is only partially closed by the piston casing. This means that a slot-shaped through-opening of the second opening, through which the flow medium can flow, is not covered by the piston casing in the closed position and is not closed by the piston. The slot-shaped through-opening is delimited at least in the closed position by a portion of the piston and an edge of the second opening. Therefore, immediately after opening the valve, a passage through which the flow medium can flow is formed between the first opening and the second opening and the pressure is quickly reduced. This is beneficial for the design of the spring.

The same effect is achieved if an annular channel is formed between the piston and the valve housing, which is directly connected to the valve seat. The annular channel can be designed as desired through the design of the valve housing and the piston. The annular channel fills with the flow medium soon after the piston lifts off the valve seat. The pressure of the flow medium is thereby transposed over a larger area of the piston.

The same effect is also achieved if the piston base and the piston casing are connected to one another by means of a transition portion formed on the piston. An annular channel is delimited by the transition portion and by a portion of the valve housing opposite the transition portion, at least in the closed position.

A combination of both of the above measures is provided. The annular channel is already open towards the second opening in the closed position of the piston at the slot-shaped through-opening.

From the measures mentioned above, it follows that the pressure that is necessary to open the valve is greater than the pressure that prevails in the valve when the piston has lifted from the valve seat. Therefore, values for the opening and closing pressures of the pressure compensating valve according to the present disclosure can be set to be constant and reliable in the process and the pressure compensation takes place within a short time.

BRIEF DESCRIPTION OF THE DRAWINGS

The present disclosure is described below with reference to an exemplary embodiment and further embodiments of a valve/pressure compensating valve. In this case, the valve is designed as a pressure compensating valve and is installed in a device for regulating the pressure of a flow medium and secured with a device for securing the valve or pressure compensating valve in a transmission component.

DETAILED DESCRIPTION

Figure 1:
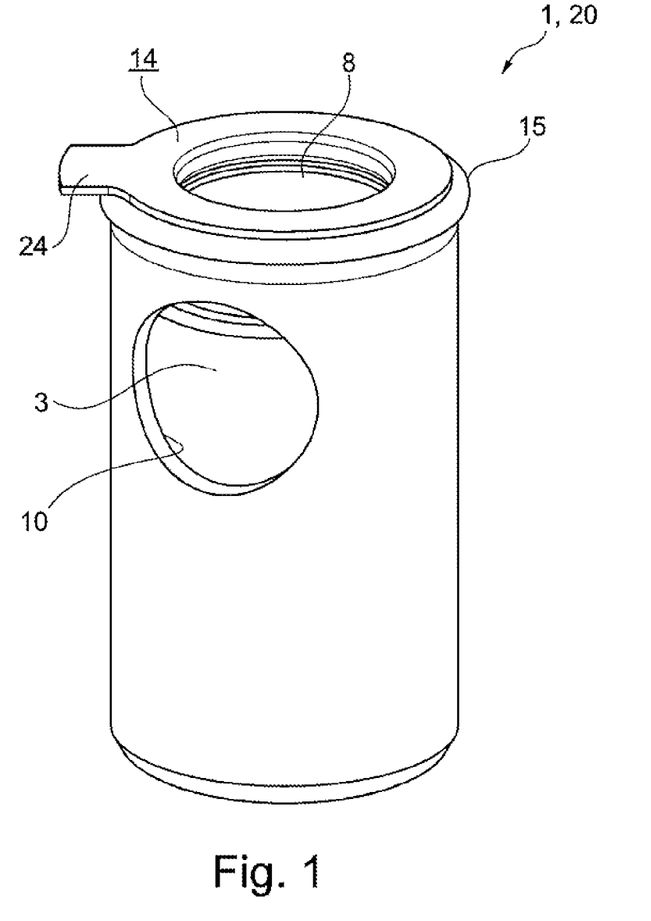
FIG. 1 shows an overall view of the pressure compensating valve 1 looking at a first opening 8, a second opening 10, a ring 14 with anti-twist device 24, and a seal 15.

The following description is made with reference to FIG. 1. In the overall view of the valve 20 designed as a pressure compensating valve 1, the valve housing 2 with a first opening 8, a second opening 10 and, behind the second opening 10, a piston 3 of the valve 20 can be partially seen. A ring 14 is secured to the edge of the valve housing 2. A seal 15, which is designed as an O-ring, sits on the edge.

Figure 2:
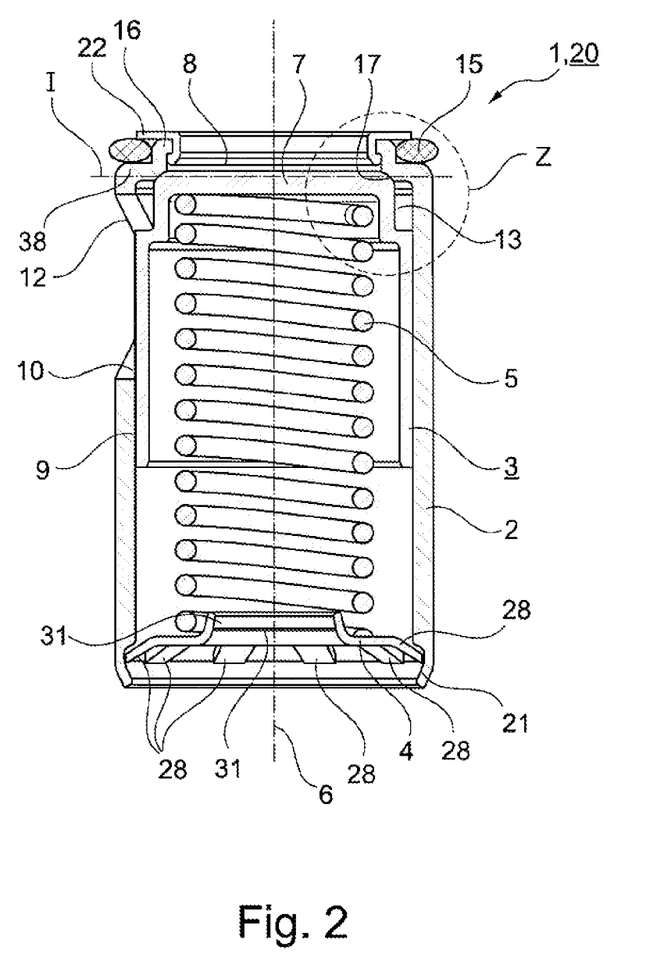
FIG. 2 shows a valve 20 designed as a pressure compensating valve 1 in a longitudinal section along the valve axis 6.
Figure 3:
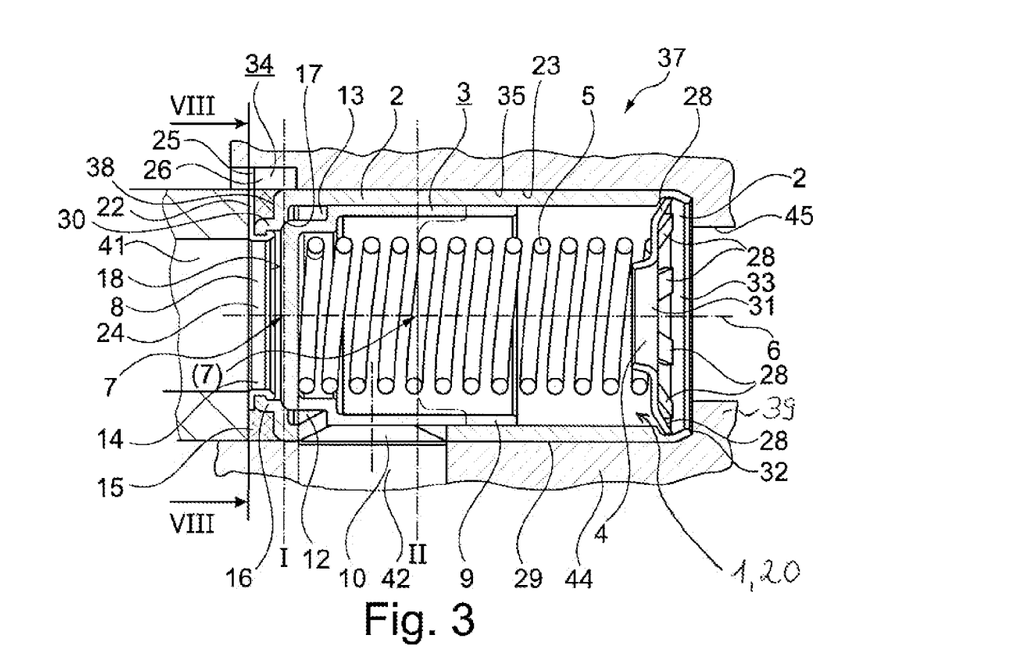
FIG. 3 shows a device 37 for regulating the pressure of a flow medium in a vehicle transmission in a longitudinal section along the valve axis 6.

As shown in FIGS. 2 and 3, the pressure compensating valve 1 has a valve housing 2, a piston 3, a support element 4, and a spring 5. The valve housing 2 and the piston 3 are designed to be essentially rotationally symmetrical and are arranged coaxially to a valve axis 6. The valve axis 6 is axially oriented. The piston 3 is axially movable but radially closely guided in the valve housing 2 with little radial play and is provided with a piston casing 9 and a piston base 7. The radial play may be approximately 30 μm. The piston casing 9 is designed as a hollow cylinder and is oriented coaxially to the valve axis 6 and extends from the piston base 7 in the direction of the support element 4.

The valve housing 2 and the piston 3 are sleeve-shaped components which may be cold-formed from flat sheet metal material, i.e., drawn and punched. The spring 5 is a compression spring and is supported axially in one direction on the piston base 7 of the piston 3 and in the other axial direction on the support element 4 so that the spring 5 is clamped axially between the piston base 7 and the support element 4. The support element 4 engages with projections 28 in a circumferential groove 21 of the valve housing 2 and is firmly supported there by the spring action of the projections 28. The piston 3 can be moved from a closed position I, shown in FIGS. 1 and 2, against the action of the spring forces of the spring 5, to an open position II, shown dashed in FIG. 3.

A support element 4 is seated in the valve housing 2 on the rear side of the pressure compensating valve 1. The support element 4 is designed to be resilient like a serrated ring, and, distributed on the circumference on a base body 31, has a plurality of serrated projections 28, which are axially secured in a form-fitting connection on the valve housing 2. The form-fitting connection is formed by the projections 28 and the circumferential groove 21, wherein the projections 28 are radially snapped into place in the circumferential groove 21. The base body 31 serves as an axial support and radial centering as well as a guide for the spring 5.

The sleeve-shaped valve housing 2 is provided with a first opening 8, through which the flow medium can flow, and with a second opening 10 on the sleeve casing 2 thereof. The first opening, formed on the head side of the pressure compensating valve 1 on the valve housing 2, is arranged coaxially to the valve axis 6 and pierced perpendicularly by the valve axis 6. The second opening 10 is oriented to be transverse to the first opening 8, i.e., so that the second opening 10 extends in the axial direction at a radial distance from the valve axis 6.

Figure 5:
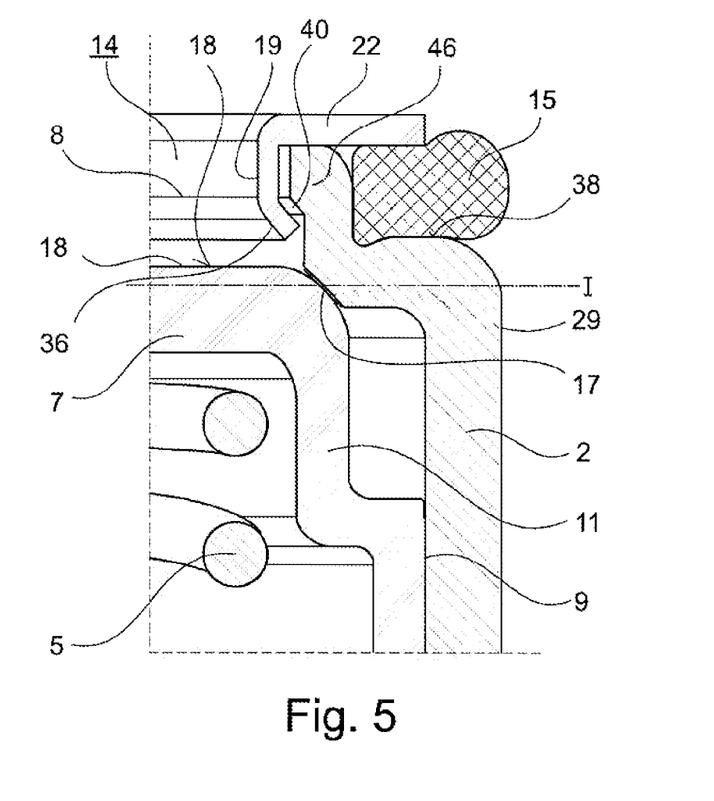
FIG. 5 shows the detail Z from the overall view of the pressure compensating valve 1 according to FIG. 1 in a not to scale and enlarged representation.

A ring 14 is secured to the edge 16 of the valve housing 2. A flange 22 of the ring 14 holds a seal 15 in position as shown in FIG. 5, the ring 14 has an annular base body 19 and is provided with a first collar 22 and a second collar 36. The first collar 22 axially engages behind the edge 16 on the outside of the valve on the valve housing 2, projecting radially beyond the opening cross section of the first opening 8. The second collar 36 is also directed radially outwardly and axially engages behind the undercut on the rib 46 inside the valve housing 2. In this way, the anti-twist device is held radially immovable at the narrowest point of the first opening 8 and axially immovable in one direction on the outside of the valve housing 2 and on the inside of the rib 46. Here, the outer edge of the second collar 36 is located axially between the surface 18 of the piston base 7 and the rib 46 and radially inside the first opening 8.

The seal 15 is centered on the hollow cylindrical portion 30 and held on the edge 16 by the first collar 22. Here, the first collar 22 is an axial stop for the seal 15 and the one axial direction. The axial direction is aligned with the valve axis 6. The other axial stop is formed by the end face 38 of the valve housing 2. The seal 15 has a circular or oval cross section at its origin. However, this cross section is shown squeezed between the first collar and the end face 38 of the valve housing 2 and brought out of its original shape. The seal 15 projects radially beyond the outer lateral surface 29 of the valve housing 2.

In the closed position I, the piston 3 is axially preloaded against the valve seat 17 by the action of the spring 5 and in this position closes the first opening 8 with the piston base 7. The closed position I is accordingly the position of the piston base 7 relative to the valve seat 17 in the closed state of the valve 3. The piston 3 rests against the valve seat 17 in a sealing manner.

As shown in FIG. 3, in the closed position I of the piston 3, the second opening 10 is largely closed by the piston casing 9, wherein however remains a slot-shaped through-opening 12 through which the flow medium can flow. The slot-shaped through-opening 12 is delimited by a casing portion of the piston 3 or by a transition portion 11 of the piston 3 and an edge of the valve housing 2 at the second opening 10. The other side, following the first opening 8 at the end 32 of the valve 20 with open cross section 33, is sealed from the open cross section 33 by the piston 3. An annular gap (leakage gap) formed between the piston casing 9 and the valve housing 2 is not taken into account due to the smaller radial play.

In the closed position I, an annular channel 13 is formed between the piston 3 and the valve housing 2, and is delimited by the transition portion 11 on the piston 3 and a portion of the valve housing 2. The annular channel 13 is only open at the slot-shaped through-opening 12 and is otherwise closed all round.

Figure 4:
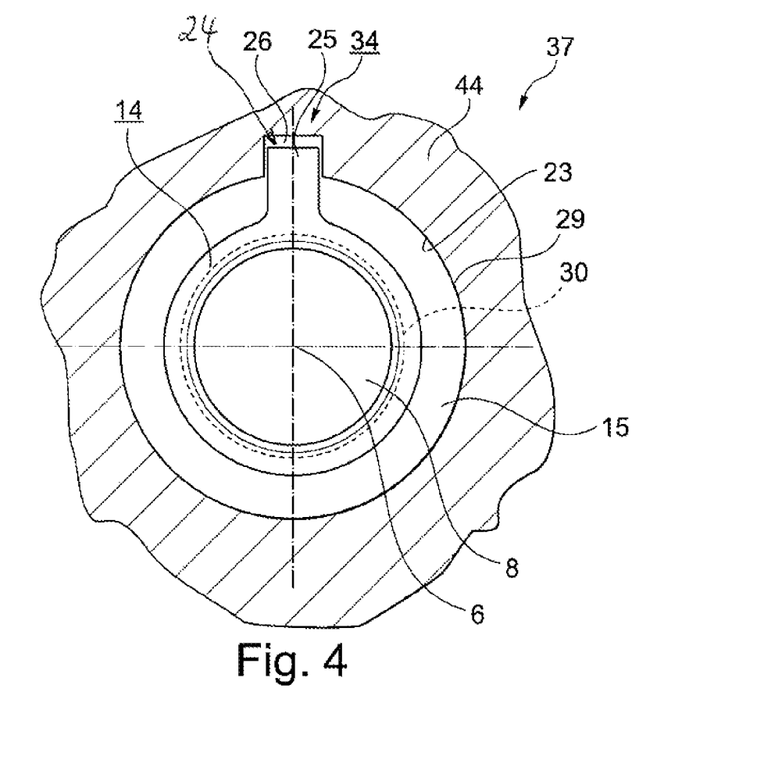
FIG. 4 shows the device 37 shown in FIG. 3 in a sectional view directed transversely to the valve axis 6.

As shown in FIGS. 3-4, the device 37 for regulating the pressures of a flow medium in a vehicle transmission is formed from at least one portion of a transmission component 44, a first channel 41, a second channel 42, the pressure compensating valve 1, the seal 15 and a third channel 45 as well as a device 34 for securing the pressure compensating valve 1 in the transmission component 44. The pressure compensating valve 1 is seated in a through-bore 35, the diameter of which is the same as that of the first channel 41 or larger or smaller than that of the first channel 41. The valve housing 2 is supported axially on a shoulder 39 in the through-bore 35. The first channel 41 leads to the first opening 8. The second opening 10 is aligned with the second channel 42 in such a way that it opens into the second channel 42. The valve 20 is inserted into the through-bore 35 of the transmission component 44 via the outer contour 29. The projection 25 projects radially beyond the edge 16 and the outer contour 29.

The device 34 for securing the pressure compensating valve 1 in the transmission component 44 is formed by the projection 25 of the anti-twist device 24 and by a recess 26 in the transmission component 44. The radial projection 25 of the anti-twist device 24 engages in a form-fitting manner in the recess 26 in the transmission component 44 and forms a form-fitting connection therewith. The valve 20 is thus secured against rotation about the valve axis 6 in the transmission component 44 via the form-fitting connection. In this case, the recess 26 is, for example, a longitudinal groove in a transmission component 44 designed as a housing or a transmission shaft. A device for the positional and position-oriented assembly of the valve 20 in the transmission component 44 is also created via the positions of the recess 26 and the projection 25. This device ensures that the second opening 10 and the second channel 42 are unequivocally aligned with one another and a connection between the first channel 41 is ensured via the valve 20 and the second channel 42 through which the flow medium can flow.

The seal 15 is elastically preloaded radially against the inner lateral surface 23 of the through-bore 35 and, for this purpose, sits radially clamped on the hollow cylindrical portion 30 between the edge 16 of the valve 20 and the transmission component 44. As can be seen in FIG. 3, the seal 15 is also axially clamped between the first flange 22 and the end face 38.

It is assumed that the pressure compensating valve 1 shown in FIG. 1 is installed in the device 37 in the closed position I of the piston 3. In this position, the force exerted by the pressure of a flow medium in the first channel 41 in the direction of the arrow on the surface 18 of the piston base is less than or equal to a counterforce acting inside the pressure compensating valve 1 on the rear of the piston base 7. The counterforce is a result of the force generated by a counter-pressure inside the pressure compensating valve 1 on the rear side of the piston base 7 and primarily the spring force exerted on the rear side of the piston base 7 of the spring 5 clamped between the piston base 7 and the support element 4.

When the pressure in the first channel 41 rises to such an extent as to exceed the resulting counterforce on the surface 18 of the piston base 7, the piston 3 moves axially towards the support element 4 and releases the valve seat 17. The flow medium flows through a passage thus provided via the first opening 8 through the inside of the annular channel 13 of the pressure compensating valve 1, which thus enlarges, via the second opening 10 into the second channel 42. In this case, subject to a leakage gap determined by the radial play, the piston 3 also seals the rear side of the pressure compensating valve 1 at its open cross section 33 towards the end 32 and thus also towards the third channel 45. Any leakage gap between the valve housing 2 and the inner lateral surface 23 is sealed by means of the seal 15.

REFERENCE NUMERALS

1 Pressure compensating valve
2 Valve housing
3 Piston
4 Support element
5 Spring
6 Valve axis
7 Piston base
8 First opening
9 Piston casing
10 Second opening
11 Transition portion
12 Slot-shaped through-opening
13 Annular channel
14 Ring
15 Seal
16 Edge
17 Valve seat
18 Surface of the piston base
19 Base body of the ring
20 Valve
21 Circumferential groove
22 First collar
23 Inner lateral surface
24 Anti-twist device
25 Projection
26 Recess in the transmission component
28 Projection of the support element
29 Outer contour of the valve housing
30 Hollow cylindrical portion
31 Base body of the support element
32 End of the valve
33 Open cross section of the valve
34 Device for securing
35 Through-bore
36 Second collar
37 Device
38 End face of the valve housing
39 Shoulder
40 Inside of the valve
41 First channel
42 Second channel
44 Transmission component
45 Third channel
46 Rib of the valve housing

The invention claimed is:

1. A valve comprising: a valve axis extending in an axial direction; a valve housing comprising a first valve housing opening through which a flow medium can pass, the first valve housing opening comprising an edge; a seal, held on the valve housing by a ring and centered on the edge with respect to the valve axis; the ring surrounding the valve axis and secured to the first valve housing opening, the ring comprising: an annular base body axially engaged in the first valve housing opening; a first collar arranged to hold the seal on the valve housing; and a second collar axially engaged behind the edge; a spring for exerting a spring force; and a piston arranged in the valve housing, coaxial to the valve housing on the valve axis, and axially facing the first valve housing opening, wherein: the piston is axially movable in the valve housing against the spring force; and the first valve housing opening can be closed by the piston.

2. The valve of claim 1, wherein the seal consists of an elastomer.

3. The valve of claim 1, wherein:
the valve housing comprises an outer contour; and
the ring comprises a projection that projects radially beyond the outer contour.

4. The valve of claim 1, wherein:
the first collar is directed radially outwardly away from the valve axis and comprises a projection;
the first collar axially engages behind the edge and the seal on an outside of the valve; and
the second collar is directed radially outwardly away from the valve axis and axially engages behind the edge on an inside of the valve.

5. The valve of claim 1 wherein the ring is formed of a sheet metal material.

6. A valve comprising:
a valve axis extending in an axial direction;
a valve housing comprising a first valve housing opening through which a flow medium can pass;
a ring surrounding the valve axis and secured to the first valve housing opening;
a seal, held on the valve housing by the ring;
a spring for exerting a spring force; and
a piston arranged in the valve housing, coaxial to the valve housing on the valve axis, and axially facing the first valve housing opening, wherein:
the piston is axially movable in the valve housing against the spring force;
the first valve housing opening can be closed by the piston;
the valve housing comprises a second valve housing opening through which the flow medium can pass;
the second valve housing opening is at least partially closable by the piston;
the valve axis extends axially through the first valve housing opening;
the second valve housing opening is radially spaced apart from the valve axis; and
the ring comprises a projection that projects radially beyond the valve housing and radially transverse to the valve axis.

7. A device for regulating pressures of a flow medium in a vehicle transmission, comprising:
a transmission component comprising a portion with a through-bore; and
the valve of claim 6 inserted into the through-bore; and
a securing device for securing the valve in the transmission component, wherein:
the portion comprises a first channel and a second channel;
the first channel leads to the first valve housing opening;
the second valve housing opening opens into the second channel;
the valve comprises a valve portion; and
the seal is radially clamped in the through-bore between the valve portion and the transmission component.

8. The device for regulating pressures of a flow medium in a vehicle transmission of claim 7, wherein:
the projection is secured to the ring;
the portion comprises a recess;
the securing device is formed by the projection and the recess;
the projection engages the recess in a form-fitting manner; and
the ring holds the seal on the valve in the axial direction in a form-fitting manner.

* * * * *